United States Patent [19]
Wang

[11] Patent Number: 5,304,412
[45] Date of Patent: Apr. 19, 1994

[54] EXTRUDED PLASTIC ARTICLE WITH A DECORATIVE PLASTIC STRIP

[75] Inventor: David Wang, Kaohsiung Hsien, Taiwan

[73] Assignee: Eli Plastics Industrial Co., Ltd., Taiwan, Taiwan

[21] Appl. No.: 977,565

[22] Filed: Nov. 17, 1992

[51] Int. Cl.$^5$ .................. B32B 1/00; A47G 35/00
[52] U.S. Cl. .................................. 428/174; 428/148; 428/172; 428/187; 428/542.2; 428/196; 428/207
[58] Field of Search ............ 428/172, 174, 141, 542.2, 428/31, 34.6, 34.7, 45, 68, 141, 143, 148, 187, 192, 196, 207

[56] References Cited

U.S. PATENT DOCUMENTS 4,952,445  8/1990  Dillon .................... 428/167

Primary Examiner—Donald J. Loney
Attorney, Agent, or Firm—Ladas & Parry

[57] ABSTRACT

An extruded plastic article includes an extruded elongated plastic frame member which has a front surface that is formed with a longitudinally extending convex projection, and a decorative plastic strip which has a rear face and a decorated front face with a metallic luster. The rear face of the decorative plastic strip is bonded to the plastic frame member at the convex projection.

5 Claims, 5 Drawing Sheets

EXTRUDED PLASTIC ARTICLE WITH A DECORATIVE PLASTIC STRIP

BACKGROUND OF THE INVENTION

1. Field of the Invention

The invention relates to an extruded plastic article with a decorative plastic strip, more particularly to such a plastic article which is inexpensive and which can be conveniently manufactured at a relatively fast rate.

2. Description of the Related Art

Most articles, which were previously made of wood, are now made of plastic due to the depleting supply of lumber. Examples of such articles, which were previously made of wood but are now made of plastic, include door frames, window frames and the like.

A conventional elongated plastic frame member is usually provided with a decorative metal strip in order to enhance the aesthetic appeal of the. Referring to FIG. 1, the front surface of an extruded elongated plastic frame member (11) is formed with a longitudinally extending groove (111). A decorative metal strip (12) is secured to the frame member (11) in the groove (111). The decorative metal strip (12) is formed with an axial opening (121) which receives an elastic filler (13) therein, thereby reducing the material cost of the decorative metal strip (12) and preventing deformation of the strip.

Referring to FIG. 2, the decorative metal strip (12) is seen as an elongated convex projection relative to the front surface of the frame member (11) when the decorative metal strip (12) is secured in the groove (111) of the frame member (11), thus enhancing the aesthetic appeal of the frame member (11).

Although the decorative metal strip (12) enhances the aesthetic appeal of the frame member (11), the following drawbacks are encountered:

1. The above described decorative plastic article cannot be manufactured at a relatively fast rate, thereby resulting in higher manufacturing costs. This drawback results from the fact that several process steps are required when manufacturing the elongated plastic frame member with the decorative metal strip. Note that the plastic frame member (11) and the decorative metal strip (12) are fabricated separately. In order to make the decorative metal strip (12) less susceptible to deformation, the decorative metal strip (12) should be formed with the axial opening (121) that receives the resilient filler (13) therein. The decorative metal strip (12) is secured to the plastic frame member (11) only after the resilient filler (13) has been inserted into the axial opening (121).

2. The material cost of the decorative strip is still relatively high because of its metal content.

SUMMARY OF THE INVENTION

Therefore, the objective of the present invention is to provide an extruded plastic article which includes an elongated plastic frame member bonded with a decorative plastic strip, which plastic article is inexpensive and can be conveniently manufactured at a relatively fast rate.

Accordingly, the preferred embodiment of an extruded plastic article of the present invention includes an extruded elongated plastic frame member which has a front surface that is formed with a longitudinally extending convex projection, and a decorative plastic strip which has a concave, rear face and a decorated front face with a metallic luster. The concave, rear face of the decorative plastic strip is bonded to the plastic frame member at the convex projection.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
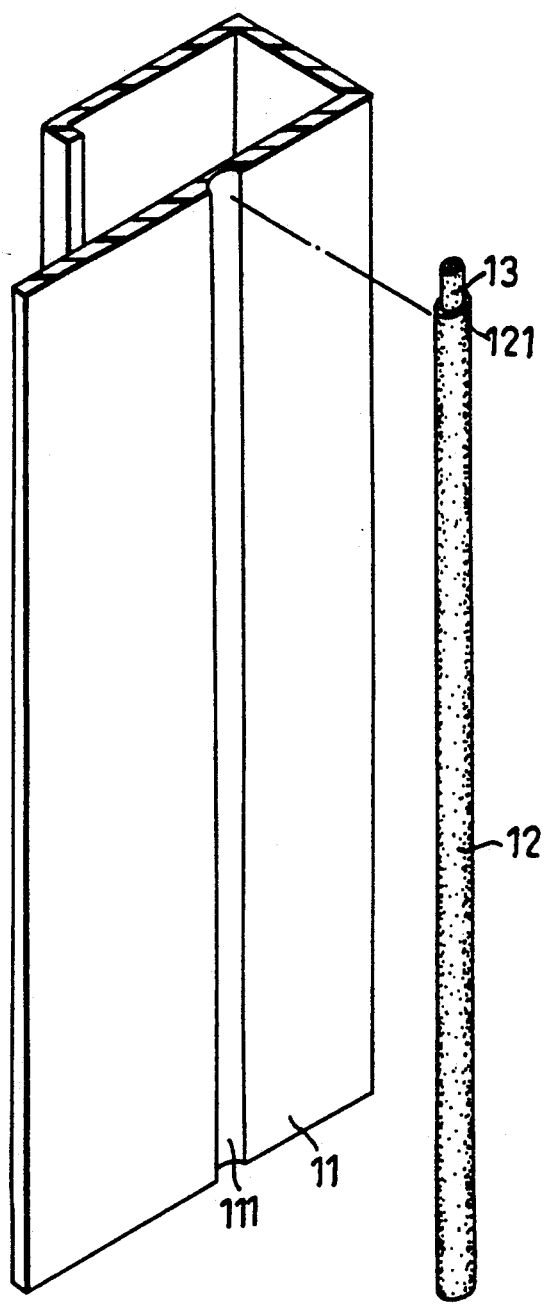
FIG. 1 is an exploded view of a conventional plastic article which includes an elongated plastic frame member and a decorative metal strip.
Figure 2:
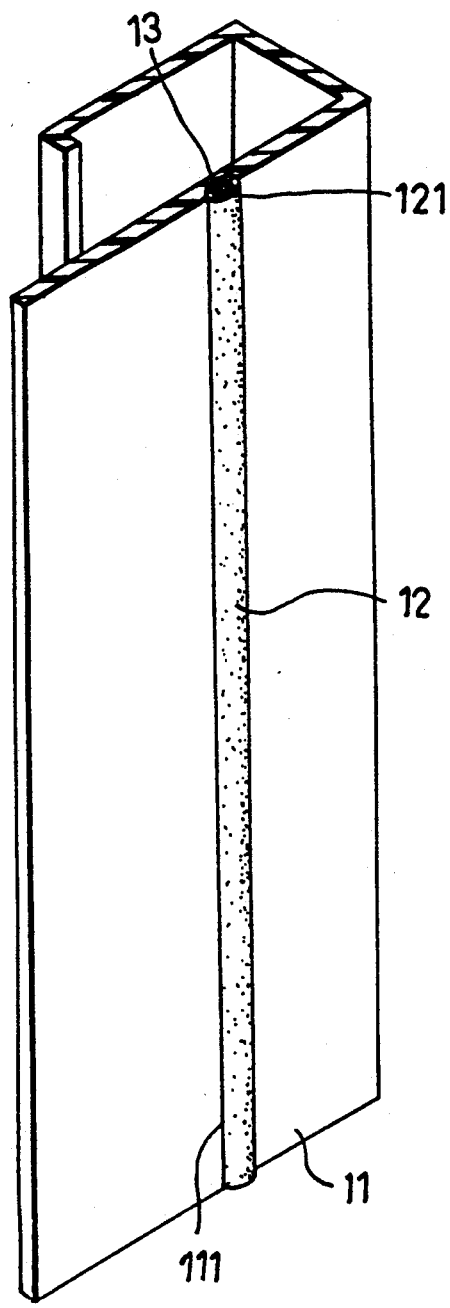
FIG. 2 is a perspective view of the conventional plastic article illustrating the decorative metal strip when secured on the plastic frame member.
Figure 3:
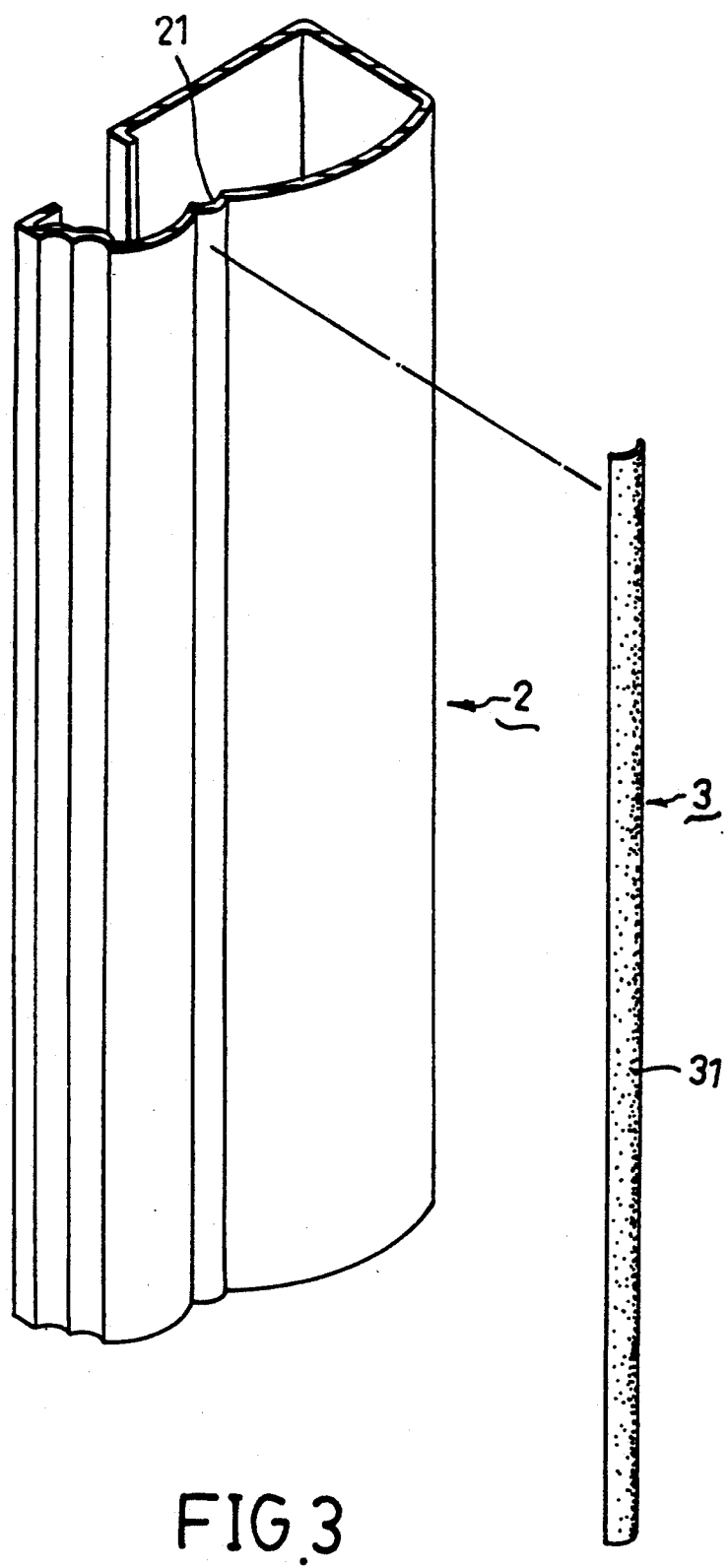
FIG. 3 is an exploded view of the preferred embodiment of an extruded plastic article according to the present invention.
Figure 4:
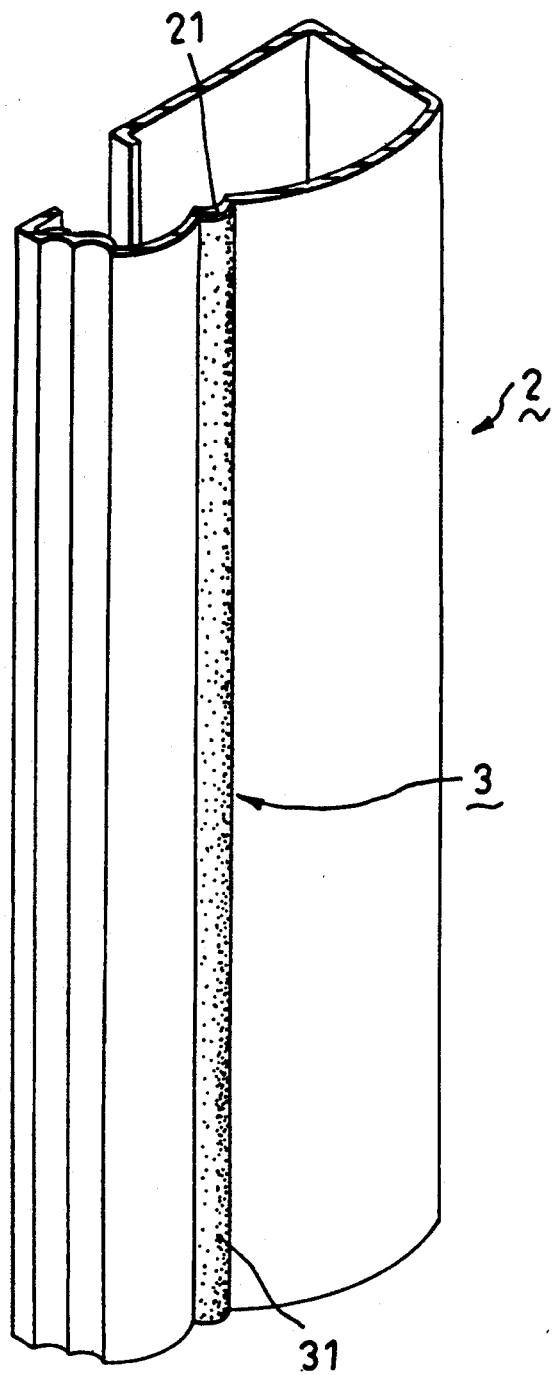
FIG. 4 is a perspective view of the preferred embodiment when a decorative plastic strip thereof is bonded to an elongated plastic frame member.

Referring to FIGS. 3 and 4, the preferred embodiment of an extruded plastic article according to the present invention is shown to comprise an elongated plastic frame member (2) and a decorative plastic strip (3). The frame member (2) is a thin wall, hollow, one-piece elongated member which is made from extruded polyvinyl chloride (PVC) plastic. The frame member (2) has a front surface on its thin, front wall which is formed with a longitudinally extending convex projection (21). The decorative plastic strip (3) has a concave rear face that is bonded to the frame member (2) at the convex projection (21). The decorative plastic strip (3) is a thin, curved, PVC plastic strip which has a decorated front face (31) with a metallic luster. Note that since the decorative plastic strip (3) covers the entire convex projection (21), the convex projection (21) and the decorative plastic strip (3) serve to provide the plastic article of the present invention with an appearance that is similar to that provided by the decorative metal strip (12) in the prior art.

Figure 5:
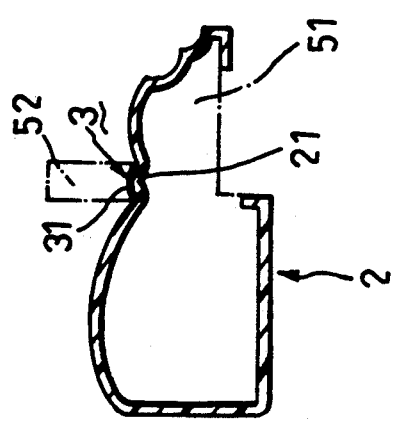
FIG. 5 is a sectional view which illustrates how the decorative plastic strip is bonded to the plastic frame member.
Figure 6:
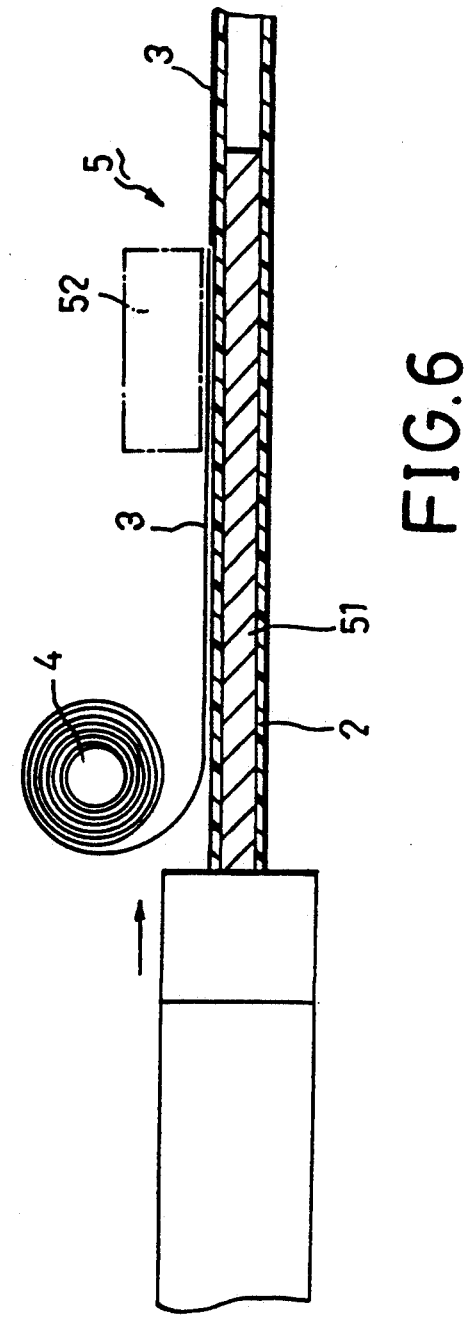
FIG. 6 illustrates the process for bonding the decorative plastic strip to the plastic frame member.

FIGS. 5 and 6 illustrate how the decorative plastic strip (3) is bonded to the frame member (2) in accordance with the present invention. The decorative plastic strip (3) is initially wound on a roller (4). The extruded frame member (2) and one end of the decorative plastic strip (3) are fed simultaneously to a bonding mechanism (5). The bonding mechanism (5) includes an inner die member (51) which extends from the output end of an extruder and into the axial opening that is confined by the frame member (2). The cross section of the inner die member (51) corresponds to that of the frame member (2), thereby preventing deformation of the frame member (2) when the decorative plastic strip (3) is bonded to the latter. The bonding mechanism (5) further includes an outer die member (52) which is disposed outside the frame member (2). The outer die member (52) presses the decorative plastic strip (3) against the frame member (2) so as to heatseal the decorative plastic strip (3) to the convex projection (21) of the frame member (2).

It has thus been shown that the extruded plastic article of the present invention can be manufactured at a relatively fast pace, thereby resulting in lower manufacturing costs. The extruded plastic article does not incorporate a decorative metal strip as required in the prior art. Instead, a decorative plastic strip with a metallic luster surface is bonded to the elongated plastic frame member, thus resulting in a lower material cost.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An extruded plastic article comprising:
    an extruded, elongated plastic frame member, said frame member being hollow and having a relatively thin front wall with a front surface formed with a longitudinally extending convex projection, and
    a decorative plastic strip having a concave rear face and a convex front face, said front face being decorative and having a metallic luster, said concave rear face of said decorative plastic strip being bonded to said convex projection on said plastic frame member.

2. The extruded plastic article as claimed in claim 1, wherein said plastic frame member and said decorative plastic strip are made of polyvinyl chloride plastic.

3. The extruded plastic article as claimed in claim 2, wherein said decorative plastic strip is bonded to said convex projection of said plastic frame member by a heat sealing connection.

4. The extruded plastic article as claimed in claim 1, wherein said convex projection forms a relatively small portion of the front wall of said plastic frame member.

5. The extruded plastic article as claimed in claim 4, wherein said frame member has a rear wall spaced from the front wall to form said hollow in the frame member.

* * * * *